Patented Dec. 1, 1931

1,834,115

UNITED STATES PATENT OFFICE

ROGER WILLIAMS, OF WILMINGTON, DELAWARE, ASSIGNOR TO DU PONT AMMONIA CORPORATION, OF WILMINGTON, DELAWARE, A CORPORATION OF DELAWARE

PROCESS OF PRODUCING HYDROGEN

No Drawing. Application filed August 5, 1926. Serial No. 127,442.

This invention relates to a method of manufacturing hydrogen from gaseous mixtures of steam and hydrocarbons with the aid of a catalyst, and particularly to the production of hydrogen of relatively low carbon monoxide content.

A process for the conversion of a mixture of steam and hydrocarbons such as methane into hydrogen by a catalytic reaction has been proposed in U. S. Patent No. 1,128,804, but the reaction depends upon the maintainence of a relatively high temperature, 700° C., and it is not adapted to produce hydrogen of a quality desirable for many purposes because of the fact that at this temperature the following reaction prevails:

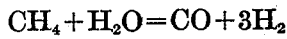
$$CH_4 + H_2O = CO + 3H_2$$

I have described in my copending application, Serial No. 118,600, an improved process for the catalytic production of hydrogen which is capable of operating at temperatures below 700° C. at which temperatures the reaction proceeds as follows:

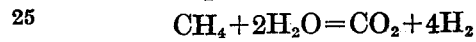
$$CH_4 + 2H_2O = CO_2 + 4H_2$$

The predominance of this reaction results in the production of the minimum quantity of carbon monoxide in the resulting gaseous mixture, and the hydrogen consequently is better adapted for utilization for the hydrogenation of fats and the production of synthetic ammonia, for example.

It is the object of the present invention to provide a further improvement of the process described in my copending application and to thus facilitate the production of hydrogen suitable for utilization for various purposes including those mentioned.

Other objects and advantages of the invention will be apparent as it is better understood by reference to the following specification in which the preferred embodiments are described.

As indicated in my copending application, it is desirable to avoid temperatures above 700° C. in the catalytic production of hydrogen from hydrocarbons for the reason that catalysts, (except such as are very refractory and consequently comparatively inactive), ordinarily suffer considerable deterioration by sintering or other change in physical form at such temperatures. Furthermore, the tendency to produce carbon monoxide in accordance with the first reaction above mentioned is to be avoided. I have found that the reaction can be conducted successfully at temperature below 700° C. by the use of a suitable catalyst material.

Nickel alone, even with the exclusion of chlorine and other catalyst poisons, is not very active for the production of hydrogen by a reaction between steam and hydrocarbons at temperatures below 700° C. I have discovered, however, that by the addition of suitable substances referred to hereinafter as promoters, the catalystic behavior of nickel in this reaction can be improved to the extent that the conversion of hydrocarbons into hydrogen becomes practicable at temperatures materially below 700° C. Among the substances which are suitable as promoters are cerium oxide, yttrium oxide, thorium oxide, zirconium oxide, molybdenum oxide, vanadium oxide, tungsten oxide, uranium oxide, titanium oxide, glucinum oxide, chromium oxide, aluminum oxide, manganese oxide, silicon oxide, tantalum oxide, boron oxide, zinc oxide, cadmium oxide, potassium oxide and calcium oxide. While the addition of promoters to nickel catalysts is especially advantageous since it permits the production of hydrogen from hydrocarbons and steam at temperatures even below 600° C., the usefulness of such promoted nickel catalysts is not limited to these temperatures. The operation can be conducted, therefore, at higher temperatures provided these temperatures do not result in the production of excessive proportions of carbon monoxide or if, on the other hand, the presence of carbon monoxide is not detrimental to the usefulness of the gaseous product.

I have also discovered that more than one promoter may be added to nickel to produce results better than those obtained with the use of a single promoter. Thus, the combination of cerium and aluminum oxides with nickel produces a more effective catalyst than that resulting from the addition of one of these oxides alone to nickel. The term "promoter" as used in the claims hereof includes, therefore, one or more of the elements hereinbefore mentioned as suitable for the purpose.

Another feature of my invention consists in the discovery that the promoting action of a given oxide for the hydrocarbon conversion catalyst is considerably improved if the promoter is combined with the catalyst in the form of a chemical compound. Thus a compound of nickel and chromium oxide such as nickel chromate is a more active catalyst than a mixture of nickel and chromium oxide. Similarly, nickel vanadate is a better catalyst than a mixture of nickel and vanadium oxide.

I have also discovered that the absence of even relatively small proportions of certain substances from the catalyst and the reacting gases is essential to the successful conversion of hydrocarbons into hydrogen. Certain substances greatly decrease or even completely inhibit the activity of nickel catalysts for this purpose. Among such substances are the halogens, such as chlorine, and compounds of sulphur. It is, therefore, advisable to avoid the presence of these and other catalyst poisons, for instance, by using salts other than the chlorides in preparing the catalytic materials and by employing gases which are free from compounds of sulphur.

From the fact that the chemical equations above mentioned entail an increase in volume, it would be expected that the application of pressure would not be advantageous since in general, according to the well known principle of Le Chatelier, pressure is favorable to chemical reactions involving a decrease in volume and unfavorable to those involving an increase in volume. I have found, however, that contrary to what would be expected, it is advantageous to carry out the catalytic reaction of steam and hydrocarbons such as methane, ethane, propane, butane, etc., under pressures higher than atmospheric even though it is necessary to increase the amount of steam employed. The improvement consists, therefore, in conducting the reaction as described in my copending application under pressure above atmospheric. Pressures of from 1 to 30 atmospheres are suitable for the reaction and even higher pressures may be employed.

Among the advantages of the operation as described are the possibility of using a smaller apparatus in handling a given amount of gas. Such apparatus is less expensive to install and maintain and it produces the further advantage that the loss of heat by radiation is decreased. Furthermore, heat exchange is more efficient when the gases are compressed. These considerations with respect to heat conservation are especially important in the present instance because the chemical reactions involved are highly endothermic and heat losses must be made up at considerable expense. Thus, the second reaction above mentioned proceeds with a heat loss of 39.3 cal. and this amount of heat must be supplied to maintain the reaction. If heat is dissipated because of the large apparatus used or the inefficiency of the exchangers a corresponding additional amount of heat must be supplied. A further advantage resulting from the use of pressure is that the elimination of carbon dioxide from the gaseous products by an absorption or other method, is facilitated by the pressure.

Although I do not intend that the invention shall be limited to any particular theory of operation, it appears that the catalyst is more active under the influences of pressure, and hence although the pressure makes the equilibrium amount of hydrogen smaller, a larger percentage of the possible equilibrium hydrogen concentration is obtained; the net result being a conversion which is not lower than at atmospheric pressure. The other and important advantages resulting from the use of pressure indicate the desirability of conducting the operation under pressures above atmospheric.

In carrying out the invention I prefer to follow the procedure with the catalyst as hereinafter indicated although the invention is not necessarily limited thereto. A number of examples are here indicated:

*Example 1.*—Crush pumice stone and screen to 8–14 mesh. Wash with boiling hydrochloric acid until free from iron and then with boiling distilled water until free from chlorides.

After drying at 200° C. stir 100 parts at that temperature into a boiling solution of 50 parts of nickel nitrate and 2.6 parts of cerium nitrate, all of which should be free from sulphur, halogens and other contact poisons, in 70 parts of distilled water. After absorption is complete remove the pumice from the solution and calcine it at 400° C until the nitrogen oxides have been expelled. Place the product in a tube in an electrically heated furnace and heat for one hour in a stream of pure hydrogen at 400° C. Methane, previously freed from contact poisons by passage over hot copper and through activated charcoal, for example, is compressed to a pressure of about 5 atmospheres, mixed with about 10 volumes of steam for each volume of methane, and is delivered to the tube containing the catalyst which is maintained at a temperature of about 600° C. A space velocity of 250 based on methane should be maintained. (The space velocity is the volume of gas flowing under standard conditions of temperature and pressure per unit volume of catalyst per hour.) The gases issuing from the tube and consisting principally (after steam condensation) of hydrogen and carbon dioxide, can be delivered at the pressure which is maintained in the tube to any suitable apparatus for the removal of carbon dioxide or directly to the space of utilization thereof.

*Example 2.*—A nickel alumina catalyst can be prepared by substituting for the solution of nickel nitrate and cerium nitrate of Example 1 a solution of 50 parts of nickel nitrate and 7.5 parts of aluminum nitrate in 70 parts of distilled water.

*Example 3.*—A nickel alumina catalyst can be prepared also as follows:—Heat a 6% solution of nickel nitrate in distilled water containing 15 parts of aluminum nitrate for each 100 parts of nickel nitrate to 40° C. Add a 6% solution of potassium hydroxide at the same temperature until precipitation is complete. Wash the precipitate by decantation with distilled water, collect on a filter and dry at 110° C. Break up the hard product and screen to the desired size. Such small amounts of potash as are held by the precipitated catalyst after washing as above appear to effect its activity favorably.

*Example 4.*—If the solution for treating the pumice as in Example 1 comprises 50 parts of nickel nitrate, 2.6 parts of cerium nitrate and 7.5 parts of aluminum nitrate in 70 parts of distilled water, a satisfactory nickel-ceria-alumina catalyst will be produced.

*Example 5.*—The pumice is prepared and treated as in Example 1, the solution for that purpose being made by dissolving 50 parts of nickel nitrate and 5 parts of chromium nitrate in 70 parts of distilled water.

*Example 6.*—A nickel chromate catalyst can be prepared by dissolving 70 parts of nickel nitrate free from sulphate and chloride in 1000 parts of distilled water. Add this solution with stirring to a boiling solution of 55 parts of potassium chromate in 1000 parts of distilled water. Wash the resulting precipitate until free from nitrates by decantation with cold distilled water. Collect on a filter, knead well and dry for 24 hours at 120° C. and for 4 hours at 150° C. Break up the resulting cake and screen to the desired size.

The conversion of the hydrocarbons with steam as described in Example 1 can be carried out in any suitable apparatus which is adapted to support the catalyst and to permit the heating thereof during the passage of the gaseous mixture at the desired pressure. The heating is essential because the reaction is endothermic and will not maintain itself, therefore, unless a suitable quantity of heat is supplied. While electric heating is suggested and is most satisfactory for the purpose, the catalyst chamber can be heated otherwise and the heat should be conserved, of course, by the provision of suitable heat interchangers to permit the transfer of heat from the outgoing product to the entering gaseous mixture.

No explanation or theory is offered as to what changes in physical form or chemical composition occur in the catalyst during the reduction treatment with hydrogen or during the conversion of hydrocarbons with steam. The term "catalyst" as employed in the claims is intended, therefore, to include the contact mass as prepared as well as any modified form in which it may exist during the reaction.

While the invention will find its widest application doubtless in the conversion of methane since that hydrocarbon occurs most commonly among the gases which are available for this purpose, it may be useful, nevertheless, in converting the higher homologues of methane, (ethane, propane, etc.), because these react even more readily with steam. Unsaturated hydrocarbons present with the saturated hydrocarbons used may also react but will tend to undergo decomposition with the deposition of carbon. The presence of such unsaturated hydrocarbons is, therefore, to be avoided so far as is possible.

The process as hereinbefore described provides an economical and satisfactory source of hydrogen produced from readily available and relatively inexpensive material. Various changes may be made in the operation as described without departing from the invention or sacrificing any of the advantages thereof.

I claim:—

1. The process of manufacturing hydrogen, which comprises passing a gaseous mixture of steam and a hydrocarbon containing at least two volumes of steam per volume of hydrocarbon over a catalyst under a pressure higher than atmospheric.

2. The process of manufacturing hydrogen, which comprises passing a gaseous mixture of steam and a hydrocarbon containing at least two volumes of steam per volume of hydrocarbon over a catalyst under a pressure above atmospheric and upward to thirty atmospheres.

3. The process of manufacturing hydrogen, which comprises passing a gaseous mixture of steam and a hydrocarbon containing at least two volumes of steam per volume of hydrocarbon over a heavy metal catalyst under a pressure higher than atmospheric.

4. Process of manufacturing hydrogen, which comprises passing a gaseous mixture containing steam and a hydrocarbon in the volume ratio of at least 2:1 over a catalyst under a pressure higher than atmospheric and at a temperature not exceeding 700° C.

5. Process of manufacturing hydrogen, which comprises passing a gaseous mixture containing steam and a hydrocarbon in the volume ratio of at least 2:1 over a catalyst under a pressure within the range of five to thirty atmospheres.

In testimony whereof I affix my signature.

ROGER WILLIAMS.